Jan. 30, 1945. G. I. CLARK 2,368,202
MOTOR POWERED EARTH MOVER
Filed Dec. 18, 1942 3 Sheets-Sheet 2
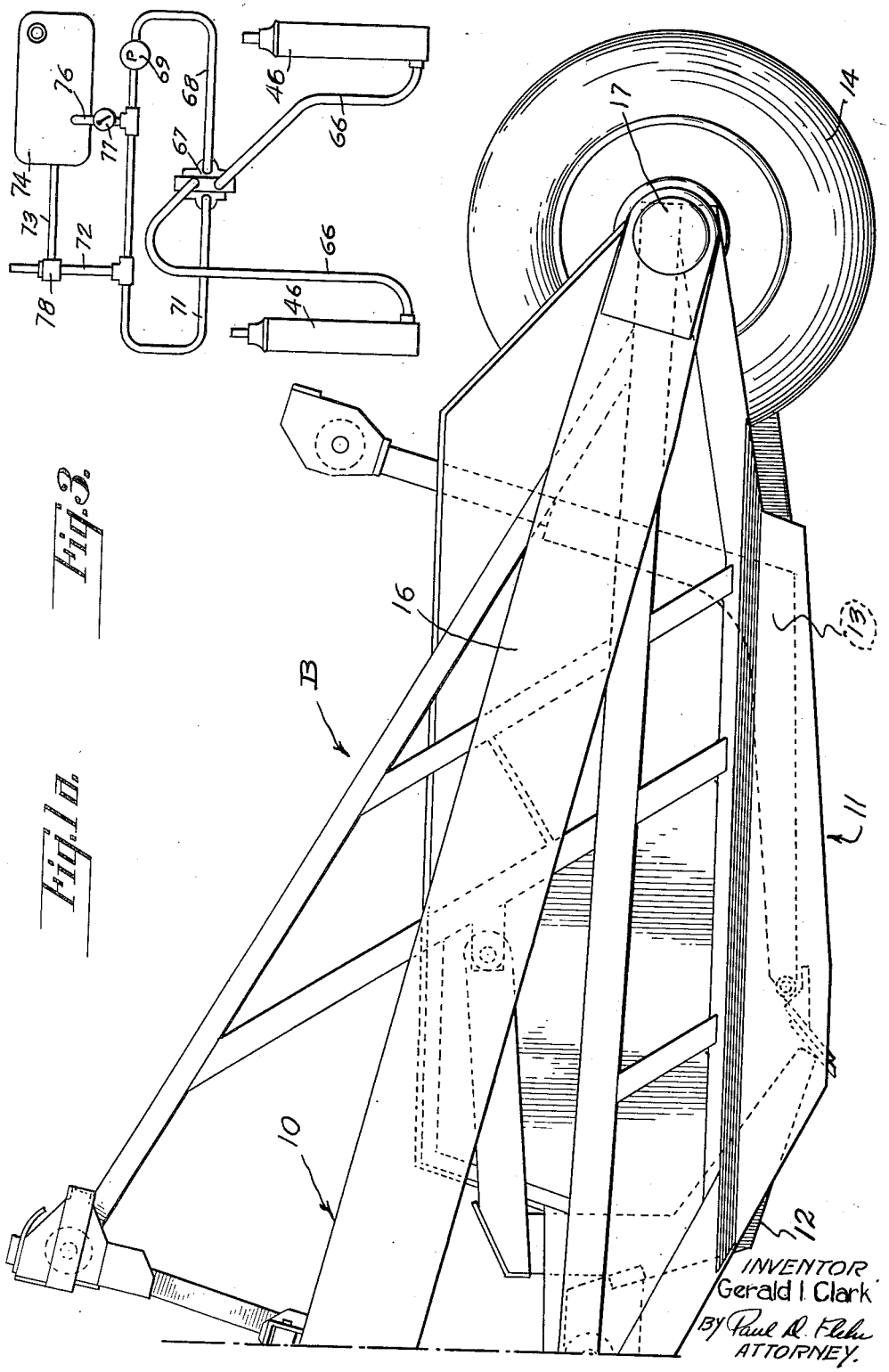
INVENTOR
Gerald I. Clark
BY Paul D. Flehr
ATTORNEY.

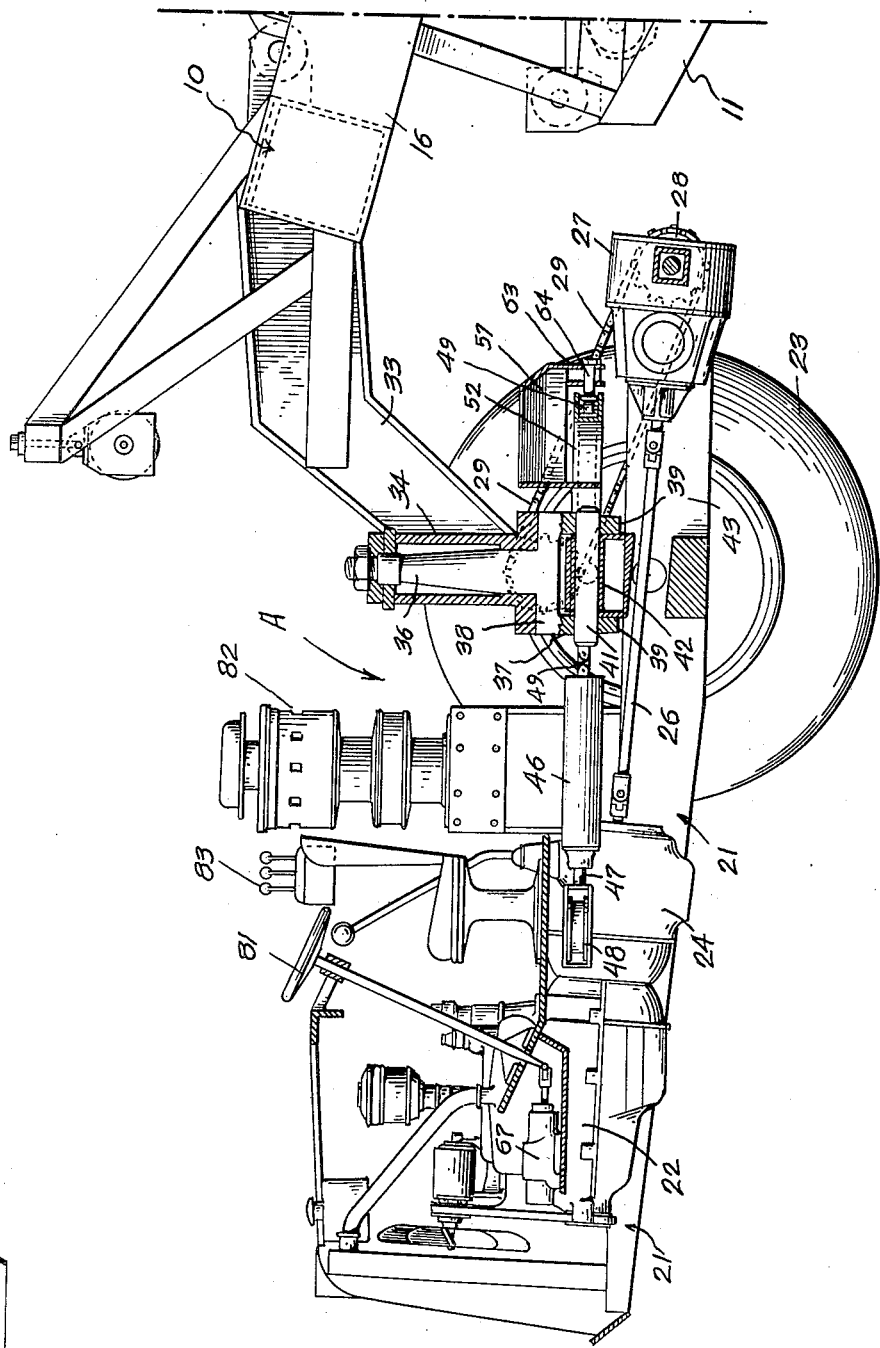

Jan. 30, 1945. G. I. CLARK 2,368,202
MOTOR POWERED EARTH MOVER
Filed Dec. 18, 1942 3 Sheets-Sheet 3

INVENTOR
Gerald I. Clark
BY Paul D. Flehr
ATTORNEY.

Patented Jan. 30, 1945

2,368,202

UNITED STATES PATENT OFFICE 2,368,202

MOTOR POWERED EARTH MOVER

Gerald I. Clark, Santa Clara, Calif., assignor to Wooldridge Manufacturing Company, Sunnyvale, Calif., a corporation of Nevada Application December 18, 1942, Serial No. 469,430

4 Claims. (Cl. 180—12)

REISSUED
AUG 1 1950
RE 23257

This invention relates generally to motor powered vehicles, and particularly to earth moving machines or like vehicles designed for the handling of relatively heavy loads.

It is an object of the invention to provide an improved machine of the above character, and which in particular will be characterized by smooth and easy steering of the front wheels on effective application of traction from the driving motor under all conditions of operation.

A further object of the invention is to provide an improved earth mover or scraper of the type having a front motor powered truck unit, and which has novel means for attaching the truck unit to the remainder of the scraper and for steering the same.

Further objects of the invention will appear from the following description in which the preferred embodiment has been set forth in detail in conjunction with the accompanying drawings.

Referring to the drawings:

Figures 1 and 1a, taken together, constitute a side elevational view of a scraper or earth mover incorporating the present invention.

Figure 3 is a diagrammatic view showing parts of the hydraulic steering mechanism.

Figure 2:
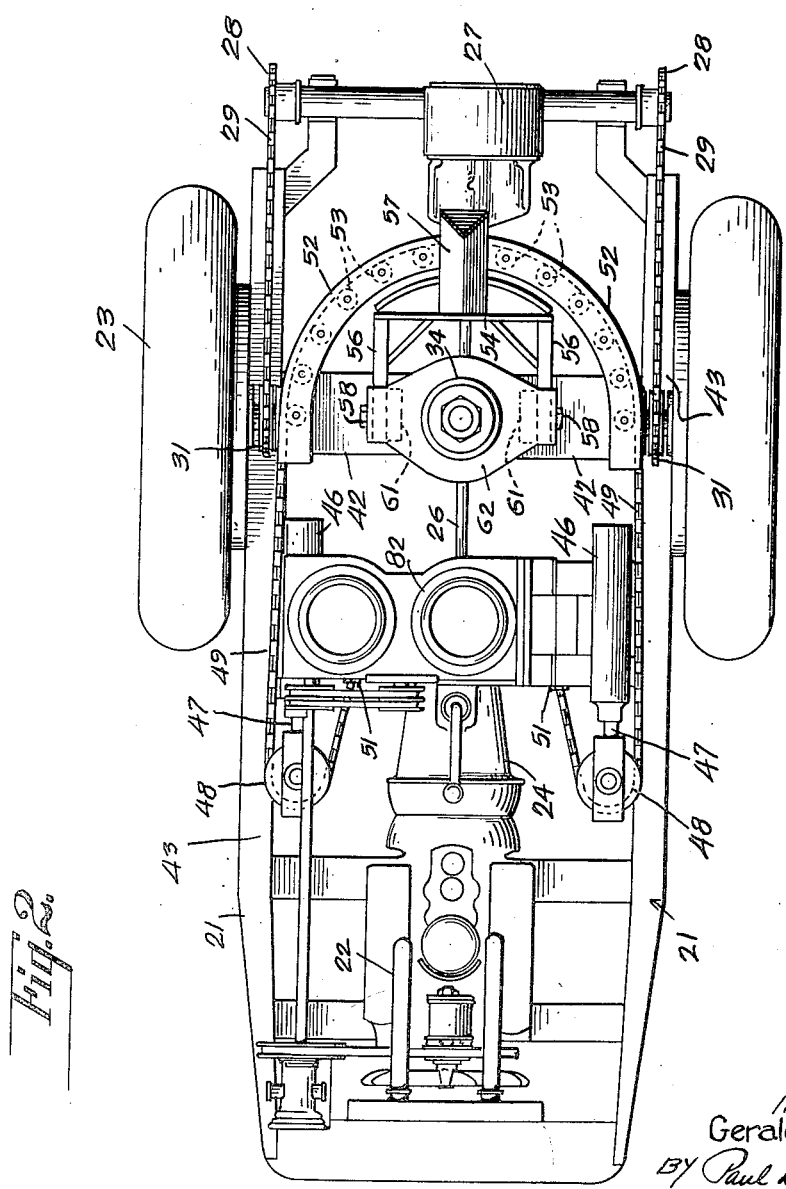
Figure 2 is a plan view illustrating the forward supplemental frame and associated parts, and which carries the driving motor and steering mechanism.

Earth moving machines adapted for digging, carrying, and earth discharging operations are well known to those skilled in the art and are shown for example in Wooldridge 2,262,310, Clark 2,271,791, and Berner application Serial Number 417,637, filed November 3, 1941, for Earth moving equipment, now Patent No. 2,318,190. As generally employed such machines make use of front and rear pairs of carrying wheels, with the axle of the front wheels connected to the forward end of the main frame by a fifth wheel or ball and socket arrangement. A draft bar extends from the front axle for attachment to a conventional tractor. Instead of relying entirely upon a tractor to move such machines, it has been proposed to directly apply power to the front wheels from a suitable motor, which in turn is mounted upon a front truck frame. (See for example Patent No. 1,530,779.) In practice it is customary for a separate tractor to push such a machine during the digging operation, after which the machine proceeds under its own power. The steering of such motor powered scrapers involves a particular problem because of the heavy loads carried, and because of the rough ground surface over which they must travel. In one machine now being manufactured the front wheels are steered by providing selectively operated clutches between the driving motor and the two front wheels, whereby the operator may apply driving force to either one of the two front wheels singly, or to both wheels simultaneously. While attempting to gain headway at the end of a digging operation, such machines are subject to "jack knifing," or in other words to uncontrolled oscillation of the front truck unit as the operator attempts to steer while at the same time secure maximum traction. This is undesirable because it interferes with development of maximum traction and it causes undue strain and wear on certain parts of the machine. In addition the type of connection employed between the motor truck frame and the frame of the scraper causes an undesirable tilting of the motor as the main scraper bowl is lifted and lowered.

The present invention uses a differential gear drive from the engine to the two front wheels, without selectively controlled clutches. The connection between the front truck unit and the main frame of the machine is such that the truck unit can turn about the vertical axis of a king pin and may also oscillate about a horizontal axis. Steering is effected by a novel mechanism interposed between the truck unit and the main frame of the machine, whereby the entire truck unit is turned about a vertical axis The machine illustrated in the drawings consists generally of a front motor powered truck unit A which is attached to the scraper unit B. The scraper unit corresponds generally to the machine disclosed in Berner Patent 2,318,190, and includes the main frame 10, the main bowl 11, the front apron or auxiliary bowl 12, and a hinged bottom 13 or expeller for the main bowl. The rear end of this structure carries the ground engaging wheels 14, while the forward end of the main frame 10 is attached to the truck unit A, as will be presently explained. As described in said Patent 2,318,190 the main frame 10 is in the form of a yoke, with side arm 16 extending along the sides of the main bowl 11 and pivotally secured to the main bowl at 17. This point of pivotal connection can be concentric with the connection of the main bowl with the rear axle of wheels 14. As described in said Patent 2,318,190 operating cables are connected to the forward end of the main bowl 11, to the expeller 13, and to the front apron 12, in order to manipulate these parts during operation of the machine. By manipulating these cables the main bowl can be lowered with respect to the frame 10 to take a cut with the apron 12 held in an elevated open position, the main bowl can then be raised to clear it from the ground with the front apron dropped or closed so that the load can be carried to a point of discharge, and the front apron can then be raised and the expeller 13 swung upwardly and forwardly to discharge the load. The arrangement of such cables and their points of connections form no part of the present in invention and has been omitted. It may be briefly pointed out however that depending upon the manner in which the cables are reaved, either two or three cables can be employed for carrying out the various operations pointed out above.

The forward truck unit A consists of a suitable rigid frame 21 which carries the driving motor 22. The shaft of this engine is connected to the front wheels 23 through the combination variable speed driving gears and clutch 24, the rearwardly extending drive shaft 26, and the differential 27. The differential drives the sprockets 28 which are connected by chains 29 with the sprockets 31. The sprockets 31 are suitably journalled to the frame and rotate pinions which in turn drive ring gears carried by the wheels 23. These wheels are mounted upon aligned stub shafts on an axis extending laterally of the frame.

The connection between the motor powered unit A and the remainder of the machine is with the forward extension 33 of the main frame 10, the extension being coincident with the central vertical plane of the machine. To establish this connection the extension 33 is provided with a journal box or hub 34 which carries the king pin 36. A cradle connection designated generally 37 establishes connection between the lower end of pin 36 and the frame 21 of the motor unit. Thus the lower end of pin 36 is secured to the plate 38, and the forward and the rear ends of this plate carry the depending ears 39, which in turn are journaled to the horizontal pivot shaft 41. Between ears 39 the shaft 41 engages the central portion of a rigid cross beam 42, the ends of which are attached to the side members 43 of the frame 21. With a connection of this character it is apparent that the motor unit A is free to oscillate about the horizontal axis of pin 41, which axis intersects with the central vertical plane of the unit A, and also with the axis of the king pin 36. Likewise the unit A is free to turn about the axis of king pin 36 relative to the frame 10.

For applying steering forces between the unit A and frame 10, I provide a pair of hydraulic operators 46, the cylinders of which are fixed to the frame 21, and which have piston rods 47 which are moved in one direction or the other by application of oil or like liquid under pressure. The piston rods carry sheaves 48 which in turn are engaged by the cables or chains 49. One end of each chain is anchored to the frame as at 51, and from this anchorage point each chain extends forwardly about a corresponding sheave 48, and then rearwardly over the arcuate guide track 52. This track can be in the form of a curved channel rigidly secured to the cross beam 42 and carrying a plurality of spaced guide rollers 53. At their rear ends the chains 49 have a common articulated connection with the frame 10. This connection is formed by a yoke 54, which has side branches 56 and a rearwardly protruding neck or arm 57. The forward ends of the side arms 56 have pivotal connection 58 with the depending ears 61, the latter being formed on the side ends of the plate 62. This plate is attached to the lower end of the journal or hub 34. The pivotal connection thus established by yoke 54 is on a horizontal axis fixed with respect to the frame 10 and extending laterally of the machine. Neck or arm 57 is disposed in the vertical central plane of the machine, and is free to move a limited amount in a vertical direction.

The rear end of the neck or arm 57 has a point of connection with the adjacent end of the chains 49. Thus for this purpose the rear end of neck 57 has depending portion 63 carrying a bolt 64, which in turn is attached to adjacent ends of chains 49. This point of connection is within the curved track 52.

A suitable arrangement for making hydraulic connections to the operators 46 is shown in Figure 3. Briefly pipes 66 connect the operators 46 with the steering valve 67. This valve is connected by pipe 68 to the discharge side of the oil pressure pump 69. Pipe 71 also connects valve 67 to the inlet side of the pump 69, so that for neutral position of valve 67 when no oil is being supplied to the operators 46, all of the oil from pump 69 is circulated through pipes 68 and 71. Pipe 71 is also connected by pipes 72 and 73 with the oil reservoir 74, and the lower part of this reservoir connects back to pipe 71 through pipe 76 and check valve 77. Pipe 72 is provided with the safety pressure relief valve 78.

When the steering valve 67 is operated from neutral position to supply liquid from pipe 68 to the left hand operator 46 as viewed in Figure 3, movement of the piston of this operator necessarily causes opposite movement of the right hand operator piston. To accommodate such movement of the right hand operator, valve 67 also connects pipe 66 to the right hand operator with liquid pipe 71, whereby an amount of liquid is displaced from the right hand operator 46 into pipe 71, corresponding to the liquid introduced from pipe 68 into the left hand operator 46. Operation of the steering valve 67 to connect pipe 68 with the right hand operator 46, necessarily causes reverse operation of the left hand operator 46, to displace liquid through its associated pipe 66 to pipe 71, as previously described. Should an unsafe pressure be developed in pipe 71, it is relieved through the valve 78. Should suction be developed in line 71, oil is withdrawn from the reservoir through the check valve 77.

Referring to Figure 1, the control valve 67 is suitably mounted near the front of the machine and is shown being operated by the hand steering wheel 81. Pump 69 is driven in any desired manner from the motor 22.

As previously explained it is desirable that the main bowl, the front apron and the expeller of the machine be operated by two or three cables. In order to wind up or play out these cables I have shown a multiple drum winch 82 of the general type disclosed and claimed in Clark Patent No. 2,270,507. Operation of the clutches and the release of the brake bands of the winch drums can be by pneumatic operators, controlled in turn by a selective pneumatic valve 83.

Operation of the machine described above can be outlined as follows: assuming that the machine is in motion the operator by turning the hand wheel 81 operates the hydraulic control valve 67, which in turn causes operation of the hydraulic operators 46. Depending upon how these operators are actuated motion is transmitted through the chains 49 by movement of sheaves 48, and because the rear ends of these chains are anchored to the arm 57, which in turn is nonrotatable with respect to frame 10, the entire truck unit A is turned about the axis of king pin 36. Any inequalities of the ground surface over which the unit travels may cause the unit A to rock about the axis of cradle shaft 41, and such rocking movement may occur in different steering positions. Since the axis of the cradle shaft 41 may assume various angles with respect to the vertical central plane of the main frame 10, the anchorage bolt 64 for connecting the chains 49 to the arm 57 assumes different levels with respect to the main frame, such movements being accommodated by swinging of arm 57 about the horizontal transverse axis of pivotal connections 58. In this connection it will be noted that the axis of pivotal connections 58 substantially intersects the axis of cradle shaft 41. This makes possible a simple type of articulated anchorage without imposing undue strains upon the parts involved.

It has been found that my machine is not subject to "jack knifing" under any conditions of operation. Full torque can be applied to the front wheels 23 from the motor while taking on a load and while endeavoring to gain headway after the bowl has been raised from the ground.

I claim:

1. In a motor powered vehicle, a structure including a main frame, a pair of rear carrying wheels secured to the structure, an upright king pin journaled to the forward end of the main frame, a supplemental forward truck frame, a pair of front wheels carried by the truck frame, a motor carried by the truck frame and connected to drive the front wheels, a cradle connected between the lower end of the king pin and the truck frame whereby the truck frame may rock about a general horizontal axis extending longitudinally of the truck frame, a yoke having side branches pivotally connected to the forward end of the main frame, the points of pivotal connection being on opposite sides of the central vertical plane of the vehicle and on an axis generally horizontal and extending laterally of the machine, the neck of the yoke being in said vertical plane and movable in a vertical direction, and steering means including motion transmitting elements serving to connect the truck frame to the neck of the yoke.

2. In a motor powered vehicle, a structure including a main frame, a pair of rear carrying wheels for the structure, an upright king pin journaled to the forward end of the main frame, a supplemental forward truck frame located generally below the forward end of the main frame, a pair of front wheels carried by the truck frame, a driving motor carried by the truck frame and connected to drive the front wheels, a cradle connected in between the lower end of the king pin and the supplemental frame whereby the supplemental frame may rock about a generally horizontal axis extending longitudinally of the truck frame, the axis of the cradle connection to the king pin being substantially at right angles to the axis of the king pin and intersecting with the same, a yoke having its side branches pivotally connected to the forward end of the main frame, the points of pivotal connection being on opposite sides of the axis of the king pin on a horizontal axis extending laterally of the machine, said axis being also located substantially on the same level as the axis for the cradle connection, the neck of the yoke being located in the vertical central plane of the machine, and being movable in a vertical direction relative to the main frame, motion transmitting elements connecting the secondary frame to the neck of the yoke, and power means for applying steering motion through said elements to turn the supplemental frame relative to the main frame.

3. The vehicle as in claim 2 in which the power means for applying steering motion includes a pair of hydraulic actuators.

4. In a motor powered vehicle, a structure including a main frame, a pair of rear carrying wheels for the structure, an upright king pin journaled to the forward end of the main frame, a supplemental frame located generally below the forward end of the main frame, a pair of front wheels carried by the suplemental frame, a motor carried by the supplemental frame and serving to drive the front wheels, a cradle connection between the lower end of the king pin and the supplemental frame, whereby the supplemental frame may rock about a generally horizontal axis extending longitudinally of the supplemental frame, and means for steering the supplemental frame and its associated wheels relative to the main frame, said means including a yoke, means for pivotally securing the side branches of the yoke at spaced points on opposite sides of the axis of the king pin and to the forward end portion of the main frame, the axis of the pivotal attachment being horizontal and laterally of the machine, the neck of the yoke being located in the central vertical plane of the vehicle and being movable in a vertical direction, a pair of flexible motion transmitting elements having corresponding ends anchored to the neck of the yoke, said elements having their other ends anchored to the supplemental frame, power means for applying steering motion to said elements, and an arcuate trackway carried by the supplemental frame and serving to guide the flexible elements.

GERALD I. CLARK.